Patented June 3, 1947

2,421,729

UNITED STATES PATENT OFFICE 2,421,729

PRODUCTION OF 3-ARYL-1,5-DIBROMPENTANE-3-CARBOXYLIC ACID

Eric Walton, Otford, and Maurice Berkeley Green, Crouch Hill, England, assignors to Burroughs Wellcome & Co. (U. S. A.) Incorporated, New York, N. Y., a corporation of New York No Drawing. Application April 14, 1944, Serial No. 531,122. In Great Britain May 20, 1943

2 Claims. (Cl. 260—515)

This invention relates to the synthesis of organic compounds which may be derived from 4-phenyl-tetrahydropyrane-4-nitrile and related compounds and which are useful as intermediates in the manufacture of further compounds, some of which have therapeutic properties, and to the manufacture of such further compounds.

In accordance with the invention compounds having the general formula

I 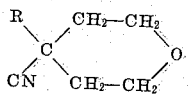

wherein R is aryl or substituted aryl, are treated with strong hydrohalogen acids (preferably fuming hydrobromic acid) to form compounds having the general formula II 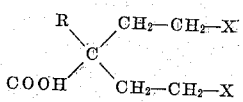

wherein X is halogen.

These compounds may be used as intermediates in several syntheses.

For example, on heating or treatment with alkalis they are converted into monohalogenated inner esters, or lactones of the type III 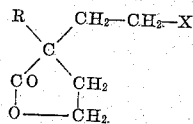

the halogen of which may be replaced by amino or alkyl amino groups (as shown for instance in Formula VI below) by treatment with alcoholic ammonia (followed by acid) or with lower primary alkylamines.

Compounds of Type III above may also be converted to pyrrolidones or lactams of the general formula IV 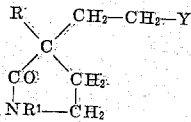

where $R^1$ is hydrogen or an alkyl, cycloalkyl, aralkyl or aryl residue and Y is hydroxyl by treatment with alcoholic ammonia or with cycloalkyl, aralkyl or arylamines.

As a further example of possible synthesis, the carboxylic group of compounds of Type II may be protected by esterification, preferably by treatment of the compound with a diazoalkane, after which the ester may be treated with a primary alkylamine to give by ring-closure compounds of the type V 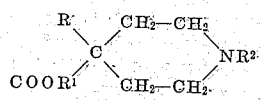

where $R^1$ and $R^2$ are alkyl groups, which may be the same or different.

The production of these compounds by other methods is already known and they have valuable therapeutic properties.

As a still further example of possible synthesis, the esters from compounds of Type II may be treated with alcoholic ammonia to give compounds of Type IV where $R^1$ is hydrogen and Y is amino. These compounds may be alkylated to give a series of compounds of Type IV where $R^1$ is hydrogen and Y is alkylamino.

The different ways in which the reactions above described may be carried into effect will be apparent from the following specific examples which are given by way of illustration only.

Example 1

To prepare 3-phenyl-1:5-dibromopentane-3-carboxylic acid (of general Formula II; R=C₆H₅, X=Br), 15.2 gms. of 4-phenyl-tetrahydropyrane-4-nitrile (I; R=C₆H₅) are heated with 60 ml. of fuming hydrobromic acid (specific gravity 1.81) in a sealed tube at 90–95° C. for 7 hours. An oil separates which can be solidified on cooling and scratching. The mixture is diluted with an equal volume of water, allowed to stand until the solid is quite hard, and is then filtered, and the solid washed with a small volume of water. The solid product (approximately 26 gms.) is recrystallised from 750 ml. of petroleum ether (of boiling point 80–100° C.) yielding 18.3 gms. of the acid (Formula II; R=C₆H₅, X=Br) crystallising in needles, which melt at 118° C.

3-phenyl-1:5-dibromopentane-3-carboxylic acid is not soluble in sodium bicarbonate as it is thereby converted into phenyl-bromoethyl-butyrolactone (Formula III; R=C₆H₅, X=Br) with loss of hydrobromic acid. On heating, it fumes, losing hydrobromic acid with formation of the same lactone. This lactone can be reconverted into 3-phenyl-1:5-dibromopentane-3-carboxylic acid in 60% yield by heating with 4 volumes of fuming hydrobromic acid (specific gravity 1.81) at 90–95° for 7 hours in a sealed tube.

Example 2

20 gms. of 3-phenyl-1:5-dibromopentane-3-carboxylic acid are dissolved in dry ether. An ethereal solution of diazoethane is run in until a permanent orange-yellow solution is produced. After standing overnight the ether is removed and a brown residual oil is obtained.

20 gms. of this oil are heated in a sealed tube with 50 ml. of 27% methyl alcoholic methylamine for 3 hours at 90–95° C. The methyl alcohol is removed and the residue poured into water and made strongly alkaline with caustic soda. The oil produced is extracted with ether, and the ether extracts dried and evaporated. The residue is distilled, and the fraction of boiling point 175–181° C./14 mm. is collected (a higher boiling fraction, B. P. 220–225°/14 mm. with decomposition, consists largely of phenyl-methylaminoethyl-butyrolactone). The distillate is acidified with hydrochloric acid and evaporated to dryness. The resulting crude hydrochloride is solidified by repeated evaporation with alcohol and ether and crystallised from alcohol-ether, in rhombs, melting point 186–187° C. identical in all respects with 1-methyl-4-phenyl-piperidine-4-carboxylic acid ethyl ester hydrochloride prepared by an established method (Formula V; $R=C_6H_5$, $R^1=C_2H_5$, $R^2=CH_3$).

This substance is known as pethidine hydrochloride and has analgesic and antispasmodic properties.

Analogous methods of synthesising similar compounds, for example by the use of other diazoalkanes or other primary amines, will be obvious to those skilled in the art.

Example 3

5 gms. of phenyl-bromoethyl-butyrolactone are heated in a sealed tube with 20 ml. of 27% methyl alcoholic methylamine at 120–130° C. for 3 hours.

The methyl alcohol is removed and the residue poured into water and made strongly alkaline with concentrated caustic soda solution. The oil produced is extracted thoroughly with ether and the ether extracts dried. The ether is removed and the residue acidified with hydrochloric acid and evaporated to dryness. The residual oil is taken up in alcohol and again evaporated. Repeated treatment with alcohol and ether causes the hydrochloride to crystallise. This product melts at 178° C. and gives analytical figures agreeing with those required for the compound phenyl-methylaminoethyl-butyrolactone hydrochloride (Formula VI):

VI
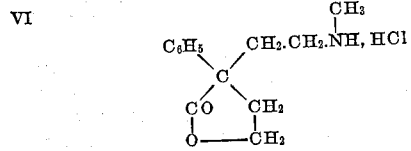

By analogous methods, for example by the use of other alkyl amines, related nitrogen derivatives of aryl butyrolactones may be prepared.

Example 4

10 grams of phenylbromoethylbutyrolactone are heated with 40 millilitres of saturated ethyl alcoholic ammonia in a sealed tube for 3 hours at 90–95° C. When cool, the solid ammonium bromide is removed and the filtrate evaporated. The residue is treated with cold very dilute hydrochloric acid until just acid, and the resulting solid crystallised from benzene in hexagonal plates, melting point 111° C., consisting of the lactam, phenyl hydroxyethylpyrrolidone, having the Formula IV, where $R=C_6H_5$, $R^1=H$ and $Y=OH$.

This pyrrolidone is soluble in strong hydrochloric acid, giving a solution which, on evaporation and treatment with alcohol-ether, yields phenylaminoethylbutyrolactone hydrochloride in the form of leaflets, of Formula III, where $R=C_6H_5$ and $X=NH_2.HCl$.

Example 5

5 grams of phenylbromoethylbutyrolactone are heated with excess of aniline for 3–4 minutes. Dilute hydrochloric acid is added, and the insoluble residue (which rapidly solidifies) crystallised from petrol in octagonal tablets, melting point 100–101° C., consisting of diphenyl hydroxyethylpyrrolidone, of Formula IV, where R and $R^1=C_6H_5$ and $Y=OH$.

Example 6

5 grams of the same lactone are heated with 5 grams of cyclohexylamine and the mixture worked up as described in the previous example. The product, phenyl cyclohexylhydroxyethylpyrrolidone crystallises from benzene-petrol in rhombs, melting point 61° C., having the Formula IV, where $R=C_6H_5$, $R^1=C_6H_{11}$ and $Y=OH$.

Example 7

5 grams of the same lactone and 5 grams of benzylamine, treated as in Example 2, gives phenyl benzyl hydroxyethylpyrrolidone in the form of needles, melting point 123–124° C., from benzene-petrol. The formula is IV, with $R=C_6H_5$, $R^1=C_7H_7$ and $Y=OH$.

Example 8

10 grams of ethyl 3-phenyl-1:5-dibromopentane-3-carboxylate (prepared from the corresponding acid and diazoethane) and 40 millilitres of saturated ethyl alcohol ammonia are heated in a sealed tube at 90–95° for 9 hours. The excess of alcohol and ammonia is removed, and the residue dissolved in water and made strongly alkaline with caustic soda. The resulting oil, after extraction with chloroform and drying, crystallises from benzene in tablets, melting point 113–115°, consisting of the strongly basic phenylaminoethylpyrrolidone. The hydrochloride crystallises from alcohol-ether in rectangular plates, melting point 151–153°. Formula IV, $R=C_6H_5$, $R^1=H$ and $Y=NH_2.HCl$.

This pyrrolidone may be used to prepare a series of substituted pyrrolidones (wherein $Y=NH.CH_3$, $NH.C_2H_5$, $NH.C_3H_7$ et cetera) as indicated in the following example.

Example 9

0.5 gram of the pyrrolidone prepared according to Example 8, 1.0 millilitres of ethyl alcohol, 0.4 gram of methyl iodide and 0.15 gram of sodium carbonate are heated together under reflux for 5 minutes. The methyl iodide and alcohol are removed and the residue strongly basified and extracted with chloroform. The oily extract consists largely of phenylmethylaminoethylpyrrolidone, the hydrochloride of which crystallises from alcohol-ether in fine needles, melting point 175.5–178°. The formula is as in Example 8, save that now $Y=NH.CH_3$, HCl.

Example 10

12 grams of 3-phenyl-1:5-dibromopentane-3-carboxylic acid ethyl ester, prepared from the corresponding acid and diazoethane as described in the first example are heated in a sealed tube with 45 millilitres of 28% ethyl alcoholic ethylamine at 90–95° for 3 hours. The excess alcohol is evaporated, and the residue is made strongly alkaline with caustic soda, and the oil extracted with ether. The ethereal extracts are dried and distilled in vacuo, the fraction of boiling point 182–195°/15 millimetres being collected. This fraction is dissolved in excess of hydrochloric acid, evaporated to dryness, and the residue crystallised from alcohol-ether, to give 1-ethyl-4-phenyl-piperidine-4-carboxylic acid ethyl ester hydrochloride, in the form of eight sided plates, of melting point 171°.

*Example 11*

10 grams of 3-phenyl-1:5-dibromopentane-3-carboxylic acid, dissolved in ether, are treated with an ethereal solution of diazomethane until a permanent yellow solution is produced. After standing overnight the ether is removed and a brown residual oil is obtained. 10 grams of this oil are heated with 40 millilitres of 27% methyl alcoholic methylamine for 3 hours in a sealed tube at 90–95° C. The alcohol is removed, and the residue poured into water, made alkaline with caustic soda and extracted with ether. The ethereal extract is dried and evaporated and the residue distilled in vacuo, the fraction of boiling point 185–210°/15–17 millimetres being collected. This fraction is dissolved in a slight excess of hydrochloric acid, evaporated to dryness, and the residue crystallised from acetone to give the hydrochloride of 1-methyl-4-phenyl-piperidine-4-carboxylic acid methyl ester; in the form of prisms, of melting point 201–2°.

*Example 12*

5 grams of phenyl bromoethyl butyrolactone are heated with 20 millilitres of ethyl alcoholic ethylamine (28%) in a sealed tube at 90–95° for 3 hours. The alcohol is removed and the residue made strongly alkaline with caustic soda and extracted with ether. The ethereal extracts are dried and evaporated leaving an oily base. Its solution in hydrochloric acid is evaporated to dryness and the residue crystallised from alcohol-ether to give phenyl-ethylamino-ethyl butyrolactone hydrochloride in the form of rectangular plates, having melting point 194°.

*Example 13*

10 grams of phenyl-bromoethyl butyrolactone are treated under reflux with 10 grams of n-propylamine for 2 hours. The excess of amine is removed and the residue worked up as in the previous example. Phenyl n-propylamino-ethyl butyrolactone hydrochloride crystallises from alcohol-ether in needles, melting point 168°.

*Example 14*

3 grams of the bromo lactone are heated with 3 grams of piperidine at 120–140° C. for 3–4 minutes. The mixture is diluted with water and extracted with ether. The ether extract is washed, dried and evaporated. The residual oil worked up as described in Example 12, gives phenyl piperidinoethyl butyrolactone hydrochloride which crystallises as rhombs from alcohol-ether, melting point 216–218°.

What we claim is:

1. The process of forming a 3-aryl-1:5-dihalopentane-3-carboxylic acid which comprises reacting upon a 4-aryl-tetrahydropyrane-4-nitrile with a strong hydrohalogen acid.

2. The process of forming a 3-aryl-1:5-dibromopentane-3-carboxylic acid which comprises reacting upon a 4-aryl-tetrahydropyrane-4-nitrile with strong hydrobromic acid.

ERIC WALTON.
MAURICE BERKELEY GREEN.

REFERENCES CITED

The following references are of record in the file of this patent:

UNITED STATES PATENTS

| Number | Name | Date |
|---|---|---|
| 2,079,962 | Miescher et al. | May 11, 1937 |
| 1,972,340 | Helwig et al. | Sept. 4, 1934 |
| 2,328,232 | Schnider | Aug. 31, 1943 |
| 2,212,056 | Tinker et al. | Aug. 20, 1940 |
| 2,382,285 | Bergel et al. | Aug. 14, 1945 |
| 2,365,808 | D'Ianni | Dec. 26, 1944 |

FOREIGN PATENTS

| Number | Country | Date |
|---|---|---|
| 550,963 | Great Britain | 1943 |
| 550,970 | Great Britain | 1943 |
| 682,078 | Germany | Oct. 7, 1939 |

OTHER REFERENCES

Boudroux, Bull. de la Soc. Chim. de France, (4), vol. 7, p. 847.

Zalkind et al., Chemical Abstracts, vol. 8, p. 3187, (1914).

Bodroux Beilstein Suppl., (4th ed., 1932), pp. 220–221.

Lipp, Beilstein, (4th ed., 1933), vol. 17, p. 12.